UNITED STATES PATENT OFFICE.

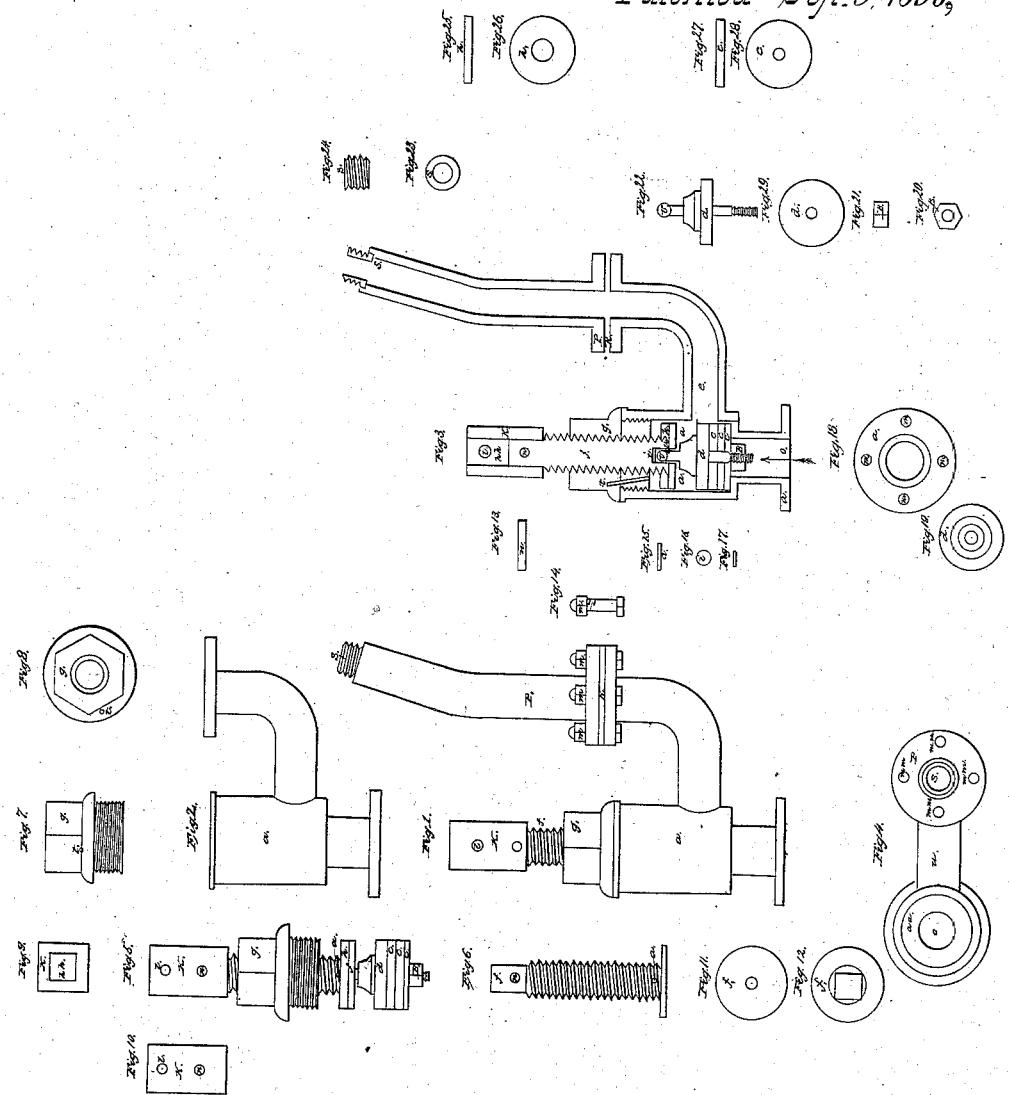
Trott, Cole & Clark,
Hydrant,
Nº 15,712.
Patented Sep. 9, 1856.

GEO. TROTT, R. H. COLE, AND WM. A. CLARK, OF ST. LOUIS, MISSOURI.

MODE OF SUSPENDING HYDRAULIC PUPPET-VALVES.

Specification of Letters Patent No. 15,712, dated September 9, 1856.

*To all whom it may concern:*

Be it known that we, GEORGE TROTT, R. H. COLE, and WILLIAM A. CLARK, of St. Louis, in the State of Missouri, have invented a new and useful Improvement in Hydrant-Valves; and we do hereby declare that the following is a full and exact description thereof, reference being had to the accompanying drawings, making part of this specification, Figure 1, being a side elevation of a hydrant cock constructed with our improved valve; Fig. 2, a side elevation of the valve chamber when the valve is removed; Fig. 3, a vertical section of the cock, showing all the parts in place; Fig. 4, a plan of the valve chamber, corresponding with Fig. 2; Fig. 5, an elevation of the valve and its appendages; Figs. 6, 7, 8, 9, 10, 11, 12, 13, 14, 15, 16, 17, 18, 19, 20, 21, 22, 23, 24, 25, 26, 27, 28 and 29 views of different parts detached; and designated by the proper letters.

Like letters designate corresponding parts in all the figures.

Our invention consists in connecting the valve with the screw stem by means of a ball playing in a loose socket, in the bottom of which is a loose, anti-friction disk, whereby the self-adjusting action of the valve is rendered more free and sure.

We employ a ball $v$, on the upper end of the upper shank of the valve $d$, which fits loosely in the socket formed in the lower end of the valve stem, and is held therein by a pin $u$, passing under the ball, but so arranged as not to interfere with the free motion of the valve. In the bottom of the socket is loosely fitted an anti-friction disk, or plate $i$, against which the ball $v$, bears. This enables said bolt to move freely in the socket, whereas otherwise there might be sufficient friction against the unyielding bottom of the socket to materially impede the motion of the valve.

The screw cap $g$, through which the valve-stem $f$, passes, is provided with a left-hand screw for receiving it in the valve chamber $a$; while the valve stem has a right-hand screw. Or if the valve stem has a left-hand screw, the said cap has a right-hand screw, the one always being cut opposite to the other. When thus constructed, if the valve is screwed up to the cap, it can be moved up no farther, for the harder the valve stem is turned, the closer the cap is screwed down. Otherwise, if the valve stem should be screwed up too high, it would be sure or liable to unscrew the cap. On the other hand, when the valve is screwed down to its seat, the cap, if it is thereby unscrewed at all, only relieves the friction of the valve on its seat and prevents its adhering there forcibly by friction and wedging.

What we claim as our invention and desire to secure by Letters Patent, is—

The combination of the ball, loose socket and anti-friction washer, when employed to connect an elastic, or yielding, valve with its stem, substantially as herein set forth.

GEORGE TROTT.
   R. H. COLE.
   WILLIAM A. CLARK.

Witnesses:
 JAMES CADDY,
 GEO. W. SMITH.